United States Patent [19]
Buer

[11] Patent Number: 6,091,821
[45] Date of Patent: Jul. 18, 2000

[54] PIPELINED HARDWARE IMPLEMENTATION OF A HASHING ALGORITHM

[75] Inventor: Mark Leonard Buer, Chandler, Ariz.

[73] Assignee: VLSI Technology, Inc., San Jose, Calif.

[21] Appl. No.: 09/022,847

[22] Filed: Feb. 12, 1998

[51] Int. Cl.$^7$ .................................. H04L 9/00; H04L 9/30
[52] U.S. Cl. ................................................. 380/30; 380/28
[58] Field of Search ........................... 380/28, 30, 269; 708/491, 492, 521; 713/174, 189

[56] References Cited

U.S. PATENT DOCUMENTS

| | | | |
|---|---|---|---|
| 4,514,592 | 4/1985 | Miyaguchi | 380/30 |
| 4,817,146 | 3/1989 | Szczutkowski et al. | 380/261 |
| 4,870,681 | 9/1989 | Sedlak | 380/30 |
| 5,166,978 | 11/1992 | Quisquater | 380/30 |
| 5,210,710 | 5/1993 | Omura | 708/492 |
| 5,261,001 | 11/1993 | Dariel et al. | 380/30 |
| 5,270,962 | 12/1993 | Fettweis | 708/655 |
| 5,295,188 | 3/1994 | Wilson et al. | 380/30 |
| 5,432,852 | 7/1995 | Leighton et al. | 380/30 |
| 5,577,123 | 11/1996 | Shimada | 380/30 |
| 5,608,801 | 3/1997 | Aiello et al. | 380/46 |
| 5,666,419 | 9/1997 | Yamamoto et al. | 380/28 |
| 5,675,653 | 10/1997 | Nelson, Jr. | 380/28 |
| 5,740,249 | 4/1998 | Shimizu et al. | 380/28 |
| 5,745,398 | 4/1998 | Monier | 708/492 |
| 5,835,600 | 11/1998 | Rivest | 380/44 |

*Primary Examiner*—Tod R. Swann
*Assistant Examiner*—James W. Myhre
*Attorney, Agent, or Firm*—Douglas L. Weller

[57] ABSTRACT

A hardware implementation of a hashing algorithm is presented. In a first pipeline stage, a first memory stores input data for the hashing algorithm. Data is selected out of the first memory, for example, using a counter which is reset and incremented by differing values depending upon the round of the algorithm. A second memory stores constants used for the hashing algorithm. Constants are selected out of the second memory, for example, using a counter. An adder adds data from the first memory and a constant from the second memory with a state value selected, for example, using a multiplexer. The result is stored as an intermediate algorithm value in a first pipeline register. In a second pipeline stage a second adder adds one of a plurality of hashing function values to the intermediate algorithm value in the first pipeline register. The result is shifted. A third adder adds the shifted result to one of the plurality of state values and places the result into a second pipeline register.

14 Claims, 2 Drawing Sheets

PIPELINED HARDWARE IMPLEMENTATION OF A HASHING ALGORITHM

BACKGROUND

The present invention concerns data encryption and pertains particularly to a pipelined hardware implementation of a hashing algorithm.

The RSA Data Security, Inc. MD5 Message-Digest Algorithm uses four state registers a, b, c and d to store a digest of 128 bits. These state registers are initialized to a known value before data is hashed through the algorithm. There are 64 operations of hashing that take place in the algorithm. These operations are split into four rounds of 16 transformations. Each of the four blocks uses a base function called a transformation to rotate and combine the state registers based on the input data. The transform uses a base function register that combines the data along with a specific shift and combine strategy.

The RSA Data Security, Inc. MD5 Message-Digest Algorithm is set out in Table 1 below.

TABLE 1

```
/* MD5C.C - RSA Data Security, Inc., MD5 message-digest algorithm
 /*
/* Copyright (C) 1991, RSA Data Security, Inc. All rights reserved.
   License to copy and use this software is granted provided that it
   is identified as the "RSA Data Security, Inc. MD5 Message-Digest
   Algorithm" in all material mentioning or referencing this software
   or this function.
   License is also granted to make and use derivative works provided
   that such works are identified as "derived from the RSA Data
   Security, Inc. MD5 Message-Digest Algorithm" in all material
   mentioning or referencing the derived work.
   RSA Data Security, Inc. makes no representations concerning
either
   the merchantability of this software or the suitability of this
   software for any particular purpose. It is provided "as is"
   without express or implied warranty of any kind.
   These notices must be retained in any copies of any part of this
   documentation and/or software.
*/
#include "global.h"
#include "md5.h"
/* Constants for MD5Transform routine.
 /*
#define S11 7
#define S12 12
#define S13 17
#define S14 22
#define S21 5
#define S22 9
#define S23 14
#define S24 20
#define S31 4
#define S32 11
#define S33 16
#define S34 23
#define S41 6
#define S42 10
#define S43 15
#define S44 21
static void MD5Transform PROTO_LIST ((UINT4 [4], unsigned char
[64]));
static void Encode PROTO_LIST ((unsigned char *, UINT4 *,
unsigned int));
static void Decode PROTO_LIST ((UINT4 *, unsigned char *,
unsigned int));
static void MD5_memcpy PROTO_LIST ((POINTER, POINTER,
unsigned int));
static void MD5_memset PROTO_LIST ((POINTER, int, unsigned
int));
static unsigned char PADDING[64] = {
  0x80, 0, 0, 0, 0, 0, 0, 0, 0, 0, 0, 0, 0, 0, 0, 0, 0, 0, 0, 0, 0,
```

TABLE 1-continued

```
  0, 0, 0, 0, 0, 0, 0, 0, 0, 0, 0, 0, 0, 0, 0, 0, 0, 0, 0, 0, 0, 0, 0,
  0, 0, 0, 0, 0, 0, 0, 0, 0, 0, 0, 0, 0, 0, 0, 0, 0, 0, 0
};
/* F, G, H and I are basic MD5 functions.
 */
#define F(x, y, z) (((x) & (y)) | ((~x) & (z)))
#define G(x, y, z) (((x) & (z)) | ((y) & (~z)))
#define H(x, y, z) ((x) ^ (y) ^ (z))
#define I(x, y, z) ((y) ^ ((x) | (~z)))
/* ROTATE_LEFT rotates x left n bits.
 */
#define ROTATE_LEFT(x, n) (((x) << (n)) | ((x) >> (32-(n))))
/* FF, GG, HH, and II transformations for rounds 1, 2, 3, and 4.
   Rotation is separate from addition to prevent recomputation.
 */
#define FF(a, b, c, d, x, s, ac) { \
    (a) += F ((b), (c), (d)) + (x) + (UINT4)(ac); \
    (a) = ROTATE_LEFT ((a), (s)); \
    (a) += (b); \
  }
#define GG(a, b, c, d, x, s, ac) { \
    (a) += G ((b), (c), (d)) + (x) + (UINT4)(ac); \
    (a) = ROTATE_LEFT ((a), (s)); \
    (a) += (b); \
  }
#define HH(a, b, c, d, x, s, ac) { \
    (a) += H ((b), (c), (d)) + (x) + (UINT4)(ac); \
    (a) = ROTATE_LEFT ((a), (s)); \
    (a) += (b); \
  }
#define II(a, b, c, d, x, s, ac) { \
    (a) += I ((b), (c), (d)) + (x) + (UINT4)(ac); \
    (a) = ROTATE_LEFT ((a), (s)); \
    (a) += (b); \
  }
/* MD5 initialization. Begins an MD5 operation, writing a new
context.
 */
void MD5Init (context)
MD5_CTX *context;                          /* context */
{
  context->count[0] = context->count[1] = 0;
  /* Load magic initialization constants.
 */
  context->state[0] = 0x67452301;
  context->state[1] = 0xefcdab89;
  context->state[2] = 0x98badcfe;
  context->state[3] = 0x10325476;
}
/* MD5 block update operation. Continues an MD5 message-digest
operation,
   processing another message block, and updating the context.
 */
void MD5Update (context, input, inputLen)
MD5_CTX *context;                          /* context */
unsigned char *input;                      /* input block */
unsigned int inputLen;                     /* length of input block */
{
  unsigned int i, index, partLen;
  /* Compute number of bytes mod 64 */
  index = (unsigned int)((context->count[0] >> 3) & 0x3F);
  /* Update number of bits */
  if ((context->count[0] += ((UINT4)inputLen << 3)) <
((UINT4)inputLen << 3))
    context->count[1]++;
  context->count[1] += ((UINT4)inputLen >> 29);
  partLen = 64 - index;
  /* Transform as many times as possible.
 */
  if (inputLen >= partLen) {
    MD5_memcpy ((POINTER)&context->buffer [index],
(POINTER)input, partLen);
    MD5Transform (context->state, context->buffer);
    for (i = partLen; i + 63 < inputLen; i += 64)
      MD5Transform (context->state, &input [i]);
    index = 0;
  }
  else
    i = 0;
```

TABLE 1-continued

```
/* Buffer remaining input */
MD5_memcpy
    ((POINTER)&context->buffer [index], (POINTER)&input [i],
inputLen-i);
}
/* MD5 finalization. Ends an MD5 message-digest operation, writing
the
    the message digest and zeroizing the context.
 */
void MD5Final (digest, context)
unsigned char digest[16];           /* message digest */
MD5_CTX *context;                   /* context */
{
    unsigned char bits[8];
    unsigned int index, padLen;
    /* Save number of bits */
    Encode (bits, context->count, 8);
    /* Pad out to 56 mod 64.
     */
    index = (unsigned int)((context->count[0] >> 3) & 0x3f);
    padLen = (index < 56) ? (56 - index) : (120 - index);
    MD5Update (context, PADDING, padLen);
    /* Append length (before padding) */
    MD5Update (context, bits, 8);
    /* Store state in digest */
    Encode (digest, context->state, 16);
    /* Zeroize sensitive information.
     */
    MD5_memset ((POINTER)context, 0, sizeof (*context));
}
/* MD5 basic transformation. Transforms state based on block.
 */
static void MD5Transform (state, block)
UINT4 state[4];
unsigned char block[64];
{
    UINT4 a = state[0], b = state[1], c = state[2], d = state[3], x[16];
    Decode (x, block, 64);
    /* Round 1 */
    FF ( a, b, c, d, x[ 0], S11, 0xd76aa478); /*  1 */
    FF ( d, a, b, c, x[ 1], S12, 0xe8c7b756); /*  2 */
    FF ( c, d, a, b, x[ 2], S13, 0x242070db); /*  3 */
    FF ( b, c, d, a, x[ 3], S14, 0xc1bdceee); /*  4 */
    FF ( a, b, c, d, x[ 4], S11, 0xf57c0faf); /*  5 */
    FF ( d, a, b, c, x[ 5], S12, 0x4787c62a); /*  6 */
    FF ( c, d, a, b, x[ 6], S13, 0xa8304613); /*  7 */
    FF ( b, c, d, a, x[ 7], S14, 0xfd469501); /*  8 */
    FF ( a, b, c, d, x[ 8], S11, 0x698098d8); /*  9 */
    FF ( d, a, b, c, x[ 9], S12, 0x8b44f7af); /* 10 */
    FF ( c, d, a, b, x[10], S13, 0xffff5bb1); /* 11 */
    FF ( b, c, d, a, x[11], S14, 0x895cd7be); /* 12 */
    FF ( a, b, c, d, x[12], S11, 0x6b901122); /* 13 */
    FF ( d, a, b, c, x[13], S12, 0xfd987193); /* 14 */
    FF ( c, d, a, b, x[14], S13, 0xa679438e); /* 15 */
    FF ( b, c, d, a, x[15], S14, 0x49b40821); /* 16 */
    /* Round 2 */
    GG ( a, b, c, d, x[ 1], S21, 0xf61e2562); /* 17 */
    GG ( d, a, b, c, x[ 6], S22, 0xc040b340); /* 18 */
    GG ( c, d, a, b, x[11], S23, 0x265e5a51); /* 19 */
    GG ( b, c, d, a, x[ 0], S24, 0xe9b6c7aa); /* 20 */
    GG ( a, b, c, d, x[ 5], S21, 0xd62f105d); /* 21 */
    GG ( d, a, b, c, x[10], S22, 0x2441453); /* 22 */
    GG ( c, d, a, b, x[15], S23, 0xd8a1e681); /* 23 */
    GG ( b, c, d, a, x[ 4], S24, 0xe7d3fbc8); /* 24 */
    GG ( a, b, c, d, x[ 9], S21, 0x21e1cde6); /* 25 */
    GG ( d, a, b, c, x[14], S22, 0xc33707d6); /* 26 */
    GG ( c, d, a, b, x[ 3], S23, 0xf4d50d87); /* 27 */
    GG ( b, c, d, a, x[ 8], S24, 0x455a14ed); /* 28 */
    GG ( a, b, c, d, x[13], S21, 0xa9e3e905); /* 29 */
    GG ( d, a, b, c, x[ 2], S22, 0xfcefa3f8); /* 30 */
    GG ( c, d, a, b, x[ 7], S23, 0x676f02d9); /* 31 */
    GG ( b, c, d, a, x[12], S24, 0x8d2a4c8a); /* 32 */
    /* Round 3 */
    HH ( a, b, c, d, x[ 5], S31, 0xfffa3942); /* 33 */
    HH ( d, a, b, c, x[ 8], S32, 0x8771f681); /* 34 */
    HH ( c, d, a, b, x[11], S33, 0x6d9d6122); /* 35 */
    HH ( b, c, d, a, x[14], S34, 0xfde5380c); /* 36 */
    HH ( a, b, c, d, x[ 1], S31, 0xa4beea44); /* 37 */
    HH ( d, a, b, c, x[ 4], S32, 0x4bdecfa9); /* 38 */
    HH ( c, d, a, b, x[ 7], S33, 0xf6bb4b60); /* 39 */
    HH ( b, c, d, a, x[10], S34, 0xbebfbc70); /* 40 */
    HH ( a, b, c, d, x[13], S31, 0x289b7ec6); /* 41 */
    HH ( d, a, b, c, x[ 0], S32, 0xeaa127fa); /* 42 */
    HH ( c, d, a, b, x[ 3], S33, 0xd4ef3085); /* 43 */
    HH ( b, c, d, a, x[ 6], S34, 0x4881d05); /* 44 */
    HH ( a, b, c, d, x[ 9], S31, 0xd9d4d039); /* 45 */
    HH ( d, a, b, c, x[12], S32, 0xe6db99e5); /* 46 */
    HH ( c, d, a, b, x[15], S33, 0x1fa27cf8); /* 47 */
    HH ( b, c, d, a, x[ 2], S34, 0xc4ac5665); /* 48 */
    /* Round 4 */
    II ( a, b, c, d, x[ 0], S41, 0xf4292244); /* 49 */
    II ( d, a, b, c, x[ 7], S42, 0x432aff97); /* 50 */
    II ( c, d, a, b, x[14], S43, 0xab9423a7); /* 51 */
    II ( b, c, d, a, x[ 5], S44, 0xfc93a039); /* 52 */
    II ( a, b, c, d, x[12], S41, 0x655b59c3); /* 53 */
    II ( d, a, b, c, x[ 3], S42, 0x8f0ccc92); /* 54 */
    II ( c, d, a, b, x[10], S43, 0xffeff47d); /* 55 */
    II ( b, c, d, a, x[ 1], S44, 0x85845dd1); /* 56 */
    II ( a, b, c, d, x[ 8], S41, 0x6fa87e4f); /* 57 */
    II ( d, a, b, c, x[15], S42, 0xfe2ce6e0); /* 58 */
    ti ( c, d, a, b, x[ 6], S43, 0xa3014314); /* 59 */
    II ( b, c, d, a, x[13], S44, 0x4e0811a1); /* 60 */
    II ( a, b, c, d, x[ 4], S41, 0xf7537e82); /* 61 */
    II ( d, a, b, c, x[11], S42, 0xbd3af235); /* 62 */
    II ( c, d, a, b, x[ 2], S43, 0x2ad7d2bb); /* 63 */
    II ( b, c, d, a, x[ 9], S44, 0xeb86d391); /* 64 */
    state[0] += a;
    state[1] += b;
    state[2] += c;
    state[3] += d;
    /* Zeroize sensitive information.
     */
    MD5_memset ((POINTER)x, 0, sizeof (x));
}
/* Encodes input (UINT4) into output (unsigned char). Assumes len is
    a multiple of 4.
 */
static void Encode (output, input, len)
unsigned char *output;
UINT4 *input;
unsigned int len;
{
    unsigned int i, j;
    for(i = 0, j = 0; j < len; i++, j += 4) {
        output[j] = (unsigned char)(input[i] & 0xff);
        output[j+1] = (unsigned char)((input[i] >> 8) & 0xff);
        output[j+2] = (unsigned char)((input[i] >> 16) & 0xff);
        output[j+3] = (unsigned char)((input[i] >> 24) & 0xff);
    }
}
/* Decodes input (unsigned char) into output (UINT4). Assumes len is
    a multiple of 4.
 */
static void Decode (output, input, len)
UINT4 *output;
unsigned char *input;
unsigned int len;
{
    unsigned int i, j;
    for(i = 0, j = 0; j < len; i++, j += 4)
        output[i] = ((UINT4)input[j]) | (((UINT4)input[j+1]) << 8) |
            (((UINT4)input[j+2]) << 16) | (((UINT4)input[j+3]) << 24);
}
/* Note: Replace "for loop" with standard memcpy if possible.
 */
static void MD5_memcpy (output, input, len)
POINTER output;
POINTER input;
unsigned int len;
{
    unsigned int i;
    for (i = 0; i < len; i++)
        output[i] = input[i];
}
/* Note: Replace "for loop" with standard memset if possible.
 */
static void MD5_memset (output, value, len)
POINTER output;
```

TABLE 1-continued

```
int value;
unsigned int len;
{
  unsigned int i;
  for (i = 0; i < len; i++)
    ((char *)output)[i] = (char)value;
}
```

The RSA Data Security, Inc. MD5 Message-Digest Algorithm, when implemented in software as shown in Table 1 above, is executed by a processor. There are some applications, however, where it is desirable to implement the RSA Data Security, Inc. MD5 Message-Digest Algorithm without requiring that the algorithm be executed by a general purpose processor.

SUMMARY OF THE INVENTION

In accordance with the preferred embodiment of the present invention, a hardware implementation of a hashing algorithm is presented. For example the hashing algorithm is the RSA Data Security, Inc. MD5 Message-Digest Algorithm.

In a first pipeline stage, a first memory stores input data for the hashing algorithm. Data is selected out of the first memory, for example, using a counter which is reset and incremented by differing values depending upon the round of the algorithm.

A second memory stores constants used for the hashing algorithm. Constants are selected out of the first memory, for example, using a counter. An adder adds data from the first memory and a constant from the second memory with a state value selected, for example, using a multiplexer. The result is stored as an intermediate algorithm value in a first pipeline register.

In a second pipeline stage a second adder adds one of a plurality of hashing function values to the intermediate algorithm value in the first pipeline register. The result is shifted. A third adder adds the shifted result to one of the plurality of state values and places the result into a second pipeline register.

The second pipeline may implemented in various manners depending upon speed and gate number constraints. For example, in the second pipeline stage separate hardware can be used to generate each state value. Alternatively, the same hardware can be used to generate all the state values and a switch can direct each state value generated to a dedicated register. Either the first pipeline or the second pipeline may be implemented as a multi-cycle path.

The present invention allows for a fast implementation of a hashing algorithm. The particular bifurcation of the algorithm into two pipeline stages as set out herein offers a significant boost in performance.

DESCRIPTION OF THE PREFERRED EMBODIMENT

Figure 1:
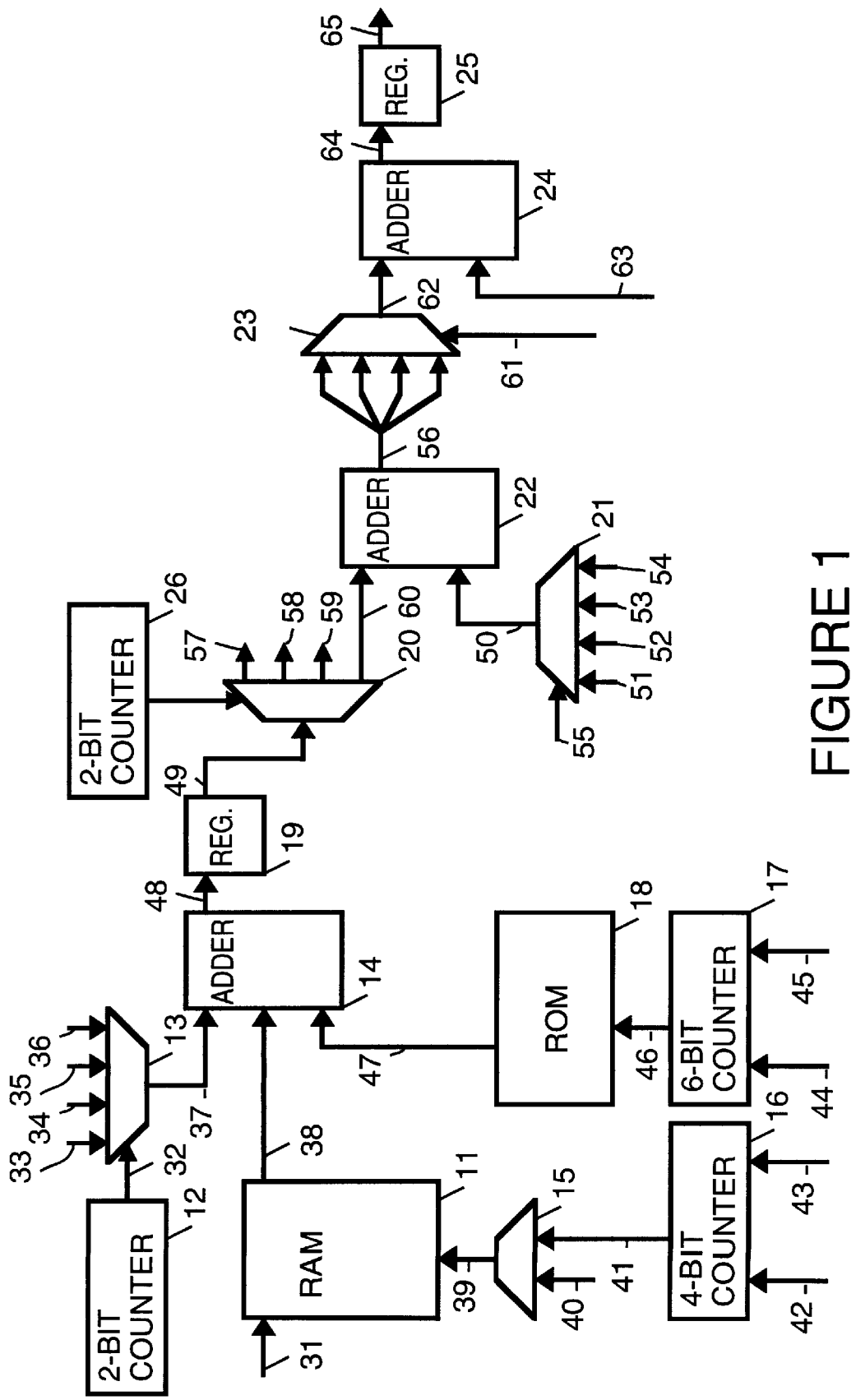
FIG. 1 is a simplified block diagram which shows a pipelined hardware implementation of the RSA Data Security, Inc. MD5 Message-Digest Algorithm flowchart in accordance with a preferred embodiment of the present invention.

FIG. 1 is a simplified block diagram which shows a pipelined hardware implementation of the RSA Data Security, Inc. MD5 Message-Digest Algorithm flowchart in accordance with a preferred embodiment of the present invention.

The pipelined hardware implementation exploits the symmetry that exists because the data is fed a word (32 bits) at a time into a function along with the value of the state registers. Then another piece of data is fed with the state registers shifted and this continues throughout each of a number of rounds.

A random access memory (RAM) 11 is used to hold sixteen thirty-two bit words. The sixteen thirty-two bit words are the array x[0:15] in the RSA Data Security, Inc. MD5 Message-Digest Algorithm.

The words in RAM 11 are fed as data in on a 32-bit data-in line 31. Addressing for RAM 11 is controlled by four-bit address lines 39. When reading data into RAM 11, a multiplexer 15 selects address lines 40 to supply the values for address lines 39.

When RAM 11 is loaded with data, during the operation of the algorithm, multiplexer 15 selects four-bit address lines 41 to supply the values for address lines 39 in order to access RAM 11 and place thirty-two bit words on a data output 38. A four-bit (modulo 16) counter 16 supplies the values for four-bit address lines 41. Four-bit counter 16 is reset using a reset input 43 and is incremented using an increment input 42.

Table 2 below sets out the rounds of the basic MD5 transformation.

TABLE 2

```
FF ( a, b, c, d, x[0], S11, 0xd76aa478); ,* 1 */
FF ( d, a, b, c, x[1], S12, 0xe8c7b756); /* 2 */
FF ( c, d, a, b, x[2], S13, 0x242070db); /* 3 */
FF ( b, c, d, a, x[3], S14, 0xc1bdceee); /* 4 */
FF ( a, b, c, d, x[4], S11, 0xf57c0faf); /* 5 */
FF ( d, a, b, c, x[5], S12, 0x4787c62a); /* 6 */
FF ( c, d, a, b, x[6], S13, 0xa8304613); /* 7 */
FF ( b, c, d, a, x[7], S14, 0xfd469501); /* 8 */
FF ( a, b, c, d, x[8], S11, 0x698098d8); /* 9 */
FF ( d, a, b, c, x[9], S12, 0x8b44f7af); /* 10 */
FF ( c, d, a, b, x[10], S13, 0xfffffbb1); /* 11 */
FF ( b, c, d, a, x[11], S14, 0x89Scd7be); /* 12 */
FF ( a, b, c, d, x[12], S11, 0x6b901122); /* 13 */
FF ( d, a, b, c, x[13], S12, 0xfd987193); /* 14 */
FF ( c, d, a, b, x[14], S13, 0xa679438e); /* 15 */
FF ( b, c, d, a, x[15], S14, 0x49b40821); /* 16 */
/* Round 2 */
GG ( a, b, c, d, x[1], S21, 0xf61e2562); /* 17 */
GG ( d, a, b, c, x[6], S22, 0xc040b340); /* 18 */
GG ( c, d, a, b, x[11], S23, 0x265e5a51); /* 19 */
GG ( b, c, d, a, x[0], S24, 0xe9b6c7aa); /* 20 */
GG ( a, b, c, d, x[5], S21, 0xd62f105d); /* 21 */
GG ( d, a, b, c, x[10], S22, 0x2441453); /* 22 */
GG ( c, d, a, b, x[15], S23, 0xd8a1e681); /* 23 */
GG ( b, c, d, a, x[4], S24, 0xe7d3fbc8); /* 24 */
GG ( a, b, c, d, x[9], S21, 0x21e1cde6); /* 25 */
GG ( d, a, b, c, x[14], S22, 0xc33707d6); /* 26 */
GG ( c, d, a, b, x[3], S23, 0xf4d50d87); /* 27 */
GG ( b, c, d, a, x[8], S24, 0x455a14ed); /* 28 */
GG ( a, b, c, d, x[13], S21, 0xa9e3e905); /* 29 */
GG ( d, a, b, c, x[2], S22, 0xfcefa3f8); /* 30 */
GG ( c, d, a, b, x[7], S23, 0x676f02d9); /* 31 */
GG ( b, c, d, a, x[12], S24, 0x8d2a4c8a); /* 32 */
/* Round 3 */
HH ( a, b, c, d, x[5], S31, 0xfffa3942); /* 33 */
HH ( d, a, b, c, x[8], S32, 0x8771f681); /* 34 */
HH ( c, d, a, b, x[11], S33, 0x6d9d6122); /* 35 */
```

TABLE 2-continued

```
HH ( b, c, d, a, x[14], S34, 0xfdeS380c); /* 36 */
HH ( a, b, c, d, x[1],  S31, 0xa4beea44); /* 37 */
HH ( d, a, b, c, x[4],  S32, 0x4bdecfa9); /* 38 */
HH ( c, d, a, b, x[7],  S33, 0xf6bb4b60); /* 39 */
HH ( b, c, d, a, x[10], S34, 0xbebfbc70); /* 40 */
HH ( a, b, c, d, x[13], S31, 0x289b7ec6); /* 41 */
HH ( d, a, b, c, x[0],  S32, 0xeaa127fa); /* 42 */
HH ( c, d, a, b, x[3],  S33, 0xd4ef3085); /* 43 */
HH ( b, c, d, a, x[6],  S34, 0x4881d05); /* 44 */
HH ( a, b, c, d, x[9],  S31, 0xd9d4d039); /* 45 */
HH ( d, a, b, c, x[12], S32, 0xe6db99e5); /* 46 */
HH ( c, d, a, b, x[15], S33, 0x1fa27cf8); /* 47 */
HH ( b, c, d, a, x[2],  S34, 0xc4ac5665); /* 48 */
/* Round 4 */
II ( a, b, c, d, x[0],  S41, 0xf4292244); /* 49 */
II ( d, a, b, c, x[7],  S42, 0x432aff97); /* 50 */
II ( c, d, a, b, x[14], S43, 0xab9423a7); /* 51 */
II ( b, c, d, a, x[5],  S44, 0xfc93a039); /* 52 */
II ( a, b, c, d, x[12], S41, 0x655b59c3); /* 53 */
II ( d, a, b, c, x[3],  S42, 0x8f0ccc92); /* 54 */
II ( c, d, a, b, x[10], S43, 0xffeff47d); /* 55 */
II ( b, c, d, a, x[1],  S44, 0x85845dd1); /* 56 */
II ( a, b, c, d, x[8],  S41, 0x6fa87e4f); /* 57 */
II ( d, a, b, c, x[15], S42, 0xfe2ce6e0); /* 58 */
II ( c, d, a, b, x[6],  S43, 0xa3014314); /* 59 */
II ( b, c, d, a, x[13], S44, 0x4e0811a1); /* 60 */
II ( a, b, c, d, x[4],  S41, 0xf7537e82); /* 61 */
II ( d, a, b, c, x[11], S42, 0xbd3af235); /* 62 */
II ( c, d, a, b, x[2],  S43, 0x2ad7d2bb); /* 63 */
II ( b, c, d, a, x[9],  S44, 0xeb86d391); /* 64 */
```

Thus, during execution of the algorithm, in round one, reset input 43 is used to reset four-bit counter 16 to 0 and increment input 42 is used to increment the address on address lines 41 by 1 after each operation. In round two, reset input 43 is used to reset four-bit counter 16 to 1 and increment input 42 is used to increment the address on address lines 41 by 5 after each operation. In round three, reset input 43 is used to reset four-bit counter 16 to 5 and increment input 42 is used to increment the address on address lines 41 by 3 after each operation. In round four, reset input 43 is used to reset four-bit counter 16 to 0 and increment input 42 is used to increment the address on address lines 41 by 7 after each operation.

Read-only memory (ROM) 18 is used to store 64 words. Each word corresponds to one of the constants used in each of the 64 operations of the RSA Data Security, Inc. MD5 Message-Digest Algorithm. The constants are listed in Table 3 below:

TABLE 3

```
/* Round 1 */
0xd76aa478); /* 1 */
0xe8c7b756); /* 2 */
0x242070db); /* 3 */
0xc1bdceee); /* 4 */
0xf57c0faf); /* 5 */
0x4787c62a); /* 6 */
0xa8304613); /* 7 */
0xfd469501); /* 8 */
0x698098d8); /* 9 */
0x8b44f7af); /* 10 */
0xffff5bb1); /* 11 */
0x895cd7be); /* 12 */
0x6b901122); /* 13 */
0xfd987193); /* 14 */
0xa679438e); /* 15 */
0x49b40821); /* 16 */
/* Round 2 */
0xf61e2562); /* 17 */
0xc040b340); /* 18 */
```

TABLE 3-continued

```
0x265e5a51); /* 19 */
0xe9b6c7aa); /* 20 */
0xd62f105d); /* 21 */
0x2441453); /* 22 */
0xd8a1e681); /* 23 */
0xe7d3fbc8); /* 24 */
0x21e1cde6); /* 25 */
0xc33707d6); /* 26 */
0xf4d50d87); /* 27 */
0x455a14ed); /* 28 */
0xa9e3e905); /* 29 */
0xfcefa3f8); /* 30 */
0x676f02d9); /* 31 */
0x8d2a4c8a); /* 32 */
/* Round 3 */
0xfffa3942); /* 33 */
0x8771f681); /* 34 */
0x6d9d6122); /* 35 */
0xfde5380c); /* 36 */
0xa4beea44); /* 37 */
0x4bdecfa9); /* 38 */
0xf6bb4b60); /* 39 */
0xbebfbc70); /* 40 */
0x289b7ec6); /* 41 */
0xeaa127fa); /* 42 */
0xd4ef3085); /* 43 */
H0x4881d05); /* 44 */
0xd9d4d039); /* 45 */
0xe6db99e5); /* 46 */
0x1fa27cf8); /* 47 */
0xc4ac5665); /* 48 */
/* Round 4*/
0xf4292244); /* 49 */
0x432aff97); /* 50 */
0xab9423a7); /* 51 */
0xfc93a039); /* 52 */
0x655b59c3); /* 53 */
0x8f0ccc92); /* 54 */
0xffeff47d); /* 55 */
0x85845dd1); /* 56 */
0x6fa87e4f); /* 57 */
0xfe2ce6e0); /* 58 */
0xa3014314); /* 59 */
0x4e0811a1); /* 60 */
0xf7537e82); /* 61 */
0xbd3af235); /* 62 */
0x2ad7d2bb); /* 63 */
0xeb86d391); /* 64 */
```

During operation of the RSA Data Security, Inc. MD5 Message-Digest Algorithm, ROM 18 places one constant on data output 47 for each operation. A six bit counter 17 is used to provide values for address lines 46 of ROM 18. Six-bit (modulo 64) counter 17 is reset using a reset input 44 and is incremented using an increment input 45. During execution of the algorithm, reset input 44 is used to reset six-bit counter 17 to 0 and increment input 45 is used to increment the address on address lines 46 by 1 after each operation.

A multiplexer 13 selects either the thirty-two bit contents of the first state register (a) from lines 33, the thirty-two bit contents of the second state register (b) from lines 34, the thirty-two bit contents of the third state register (c) from lines 35 or the thirty-two bit contents of the fourth state register (d) from lines 36 to be placed on thirty-two bit data lines 37. A two-bit (modulo 4) counter 12, incremented for each operation, is used to control selections made by multiplexer 13.

An adder 14 adds the data on data lines 37, data lines 38 and data lines 47 and through lines 48 places the result in a thirty-two bit pipeline register 19.

The computations to generate the value placed in thirty-two bit pipeline register 19 act as a base function call to compute a portion of the result from the state registers. The two-stage pipeline is useful because the current round will not change the state register that is operated on in the next round. Thus the value placed in pipeline register 19 can be computed the clock cycle before it is used in the transformation combination to the function. Also, multiple cycle paths are used if a stage of the pipeline requires more than a single clock cycle.

The value in pipeline register 19 is used in the second pipeline stage. A multiplexer 20 selects output 49 of pipeline register 19 to be used to generate a value for one of the state registers. A two-bit (modulo 4) counter 26, incremented for each operation, is used to control selections made by multiplexer 20.

When the second pipeline stage generates an output for the first state register (a), multiplexer 20 selects output 49 of pipeline register 19 to be connected to multiplexer output 60. When the second pipeline stage generates an output for the second state register (b), multiplexer 20 selects output 49 of pipeline register 19 to be connected to multiplexer output 59. When the second pipeline stage generates an output for the third state register (c), multiplexer 20 selects output 49 of pipeline register 19 to be connected to multiplexer output 58. When the second pipeline stage generates an output for the fourth state register (d), multiplexer 20 selects output 49 of pipeline register 19 to be connected to multiplexer output 57.

The remaining hardware shown in FIG. 1 shows hardware used to generate an output for the first state register (a). A multiplexer 21, responsive to a control input 55, selects one of the values on input 51, input 52, input 53 and input 54 to be placed on adder input 50. The value on input 51 is the result of F(b,c,d). The value on input 52 is the result of G(b,c,d). The value on input 53 is the result of H(b,c,d). The value on input 54 is the result of I(b,c,d). The functions F, G, H, and I are basic functions of the RSA Data Security, Inc. MD5 Message-Digest Algorithm, as is set out in the excerpt of the RSA Data Security, Inc. MD5 Message-Digest Algorithm set out below in Table 4 below:

TABLE 4

```
/* F, G, H and I are basic MD5 functions.
*/
#define F(x, y, z) (((x) & (y)) | ((~x) & (z)))
#define G(x, y, z) (((x) & (z)) | ((y) & (~z)))
#define H(x, y, z) ((x) ^ (y) ^ (z))
#define I(x, y, z) ((y) ^ ((x) | (~z)))
```

An adder 22 adds the thirty-two bit value on multiplexer output 60 and the thirty-two bit value on adder input 50 and places the result on an adder output 56. A four-to-one multiplexer 23, controlled by a control input 61, is used shift adder output 56. Thus four-to-one multiplexer 23 implements the function ROTATE_LEFT(x,n), as is set out in the excerpt of the RSA Data Security, Inc. MD5 Message-Digest Algorithm set out below in Table 5 below:

TABLE 5

```
/* ROTATE_LEFT rotates x left n bits.
*/
#define ROTATE_LEFT(x, n)(((x) << (n)) | ((x) >> (32-(n))))
```

An adder 24 adds an output 62 of multiplexer 23 to the contents of the second state register (b) placed on adder input 63. A pipeline register 25 stores the output of the second stage of the pipeline. Via output 65, the contents of pipeline register 25 are placed in the first state register (a).

The hardware connected to multiplexer output 59, used to generate an output for the second state register (b), is equivalent to the hardware shown connected to multiplexer output 60, used to generate an output for the first state register (a). The hardware connected to multiplexer output 58, used to generate an output for the third state register (c), is also equivalent to the hardware shown connected to multiplexer output 60, used to generate an output for the first state register (a). The hardware connected to multiplexer output 57, used to generate an output for the fourth state register (d), is also equivalent to the hardware shown connected to multiplexer output 60, used to generate an output for the first state register (a).

Figure 2:
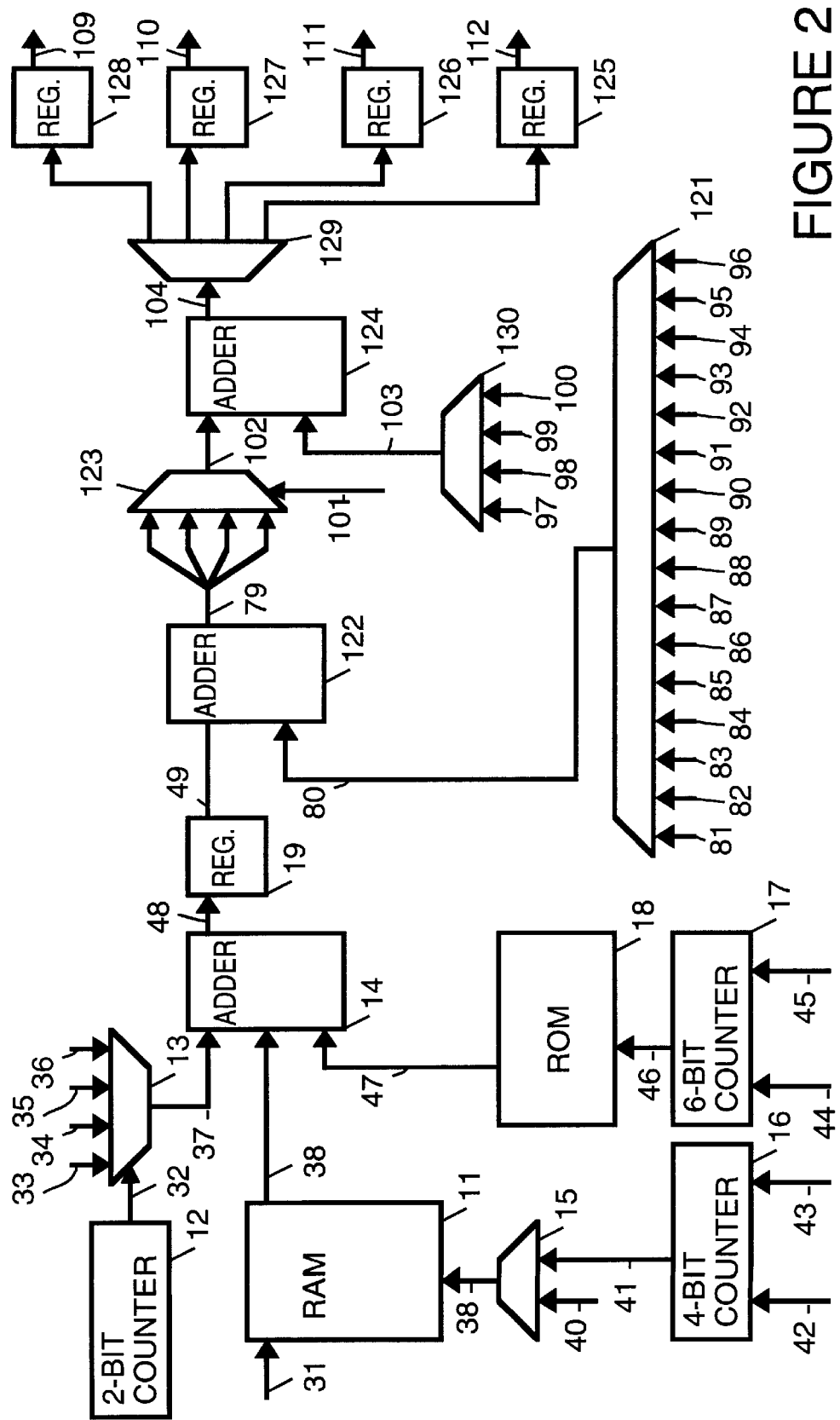
FIG. 2 is a simplified block diagram which shows a pipelined hardware implementation of the RSA Data Security, Inc. MD5 Message-Digest Algorithm flowchart in accordance with an alternative preferred embodiment of the present invention.

FIG. 2 shows alternate hardware used to implement the second link of the pipeline. The hardware shown in FIG. 2 shows hardware used to generate an output for the first state register (a), the second state register (b), the third state register (c) and the fourth state register (d). A multiplexer 121 selects one of the values on input 81, input 82, input 83, input 84, input 85, input 86, input 87, input 88, input 89, input 90, input 91, input 92, input 93, input 94, input 95, input 96, to be placed on adder input 80 of adder 122. The value on input 81 is the result of F(b,c,d). The value on input 82 is the result of F(a,b,c). The value on input 83 is the result of F(d,a,b). The value on input 84 is the result of F(c,d,a). The value on input 85 is the result of G(b,c,d). The value on input 86 is the result of G(a,b,c). The value on input 87 is the result of G(d,a,b). The value on input 88 is the result of G(c,d,a). The value on input 89 is the result of H(b,c,d). The value on input 90 is the result of H(a,b,c). The value on input 91 is the result of H(d,a,b). The value on input 92 is the result of H(c,d,a). The value on input 93 is the result of I(b,c,d). The value on input 94 is the result of I(a,b,c). The value on input 95 is the result of I(d,a,b). The value on input 96 is the result of I(c,d,a).

The functions F, G, H, and I are basic functions of the RSA Data Security, Inc. MD5 Message-Digest Algorithm, as is set out above.

An adder 122 adds the thirty-two bit value on output 49 of pipeline register 19 and the thirty-two bit value on adder input 80 and places the result on an adder output 79. A four-to-one multiplexer 123, controlled by a control input 101, is used shift adder output 79. Thus four-to-one multiplexer 123 implements the function ROTATE_LEFT(x,n), as is set out in the excerpt of the RSA Data Security, Inc. MD5 Message-Digest Algorithm as described above.

An adder 124 adds an output 102 of multiplexer 123 to an output 103 of a multiplexer 130. Multiplexer 130 selects the value on lines 97, the value on lines 98, the output on lines 99 or the output on lines 100 to forward through to output 103. The value on lines 97 is the contents of first state register (a). The value on lines 98 is the contents of second state register (b). The value on lines 99 is the contents of third state register (c). The value on lines 100 is the contents of fourth state register (d).

A multiplexer 129 selects an output 104 adder to be forwarded to a pipeline register 125, a pipeline register 126, a pipeline register 127 and a pipeline register 128. The contents of pipeline register 125 are forwarded, via lines 112 to the first state register (a). The contents of pipeline register 126 are forwarded, via lines 111 to the second state register (b). The contents of pipeline register 127 are forwarded, via lines 110 to the third state register (c). The contents of pipeline register 128 are forwarded, via lines 109 to the fourth state register (d).

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. Hardware which implements a hashing algorithm comprising:
   a first pipeline stage comprising:
      first storage means for storing input data for the hashing algorithm, the first storage means having a first storage means output,
      first selection means, coupled to the first storage means, for selecting data from the first storage means to be placed on the storage means output,
      second storage means for storing constants used for the hashing algorithm, the second storage means having a second storage means output,
      second selection means, coupled to the second storage means, for selecting a constant from the second storage means to be placed on the storage means output,
      third selection means for selecting one of a plurality of state values to be placed onto a third selection means output,
      a first pipeline storage means, for storing an intermediate algorithm value, and
      a first adding means for adding values on the first storage means output, the second storage means output and the third selection means output and placing a first adding means result into the first pipeline storage means; and,
   a second pipeline stage comprising:
      fourth selection means for selecting one of a plurality of hashing function values to be placed on a fourth selection means output,
      a second adding means for adding the intermediate algorithm value in the first pipeline storage means to a value placed on the fourth selection means output to produce a second adding means result,
      shifting means for shifting the second adding means result to produce a shifted result,
      a second pipeline storage means for storing an algorithm generated state value, and
      a third adding means for adding the shifted result to one of the plurality of state values and placing a third adding means result into the second pipeline storage means.

2. Hardware as in claim 1 wherein the hashing algorithm is the RSA Data Security, Inc. MD5 Message-Digest Algorithm.

3. Hardware as in claim 1 wherein the algorithm generated state value is used as a first state value and wherein the third adding means adds the shifted result to a second state value.

4. Hardware as in claim 3 wherein the second pipeline stage additionally comprises:
   fifth selection for selecting the second adding means to receive the intermediate algorithm value when the first state value is to be calculated.

5. Hardware as in claim 1 wherein the second pipeline stage additionally comprises:
   a third pipeline storage means for storing the algorithm generated state value;
   a fourth pipeline storage means for storing the algorithm generated state value;
   a fifth pipeline storage means for storing the algorithm generated state value; and,
   fifth selection for selecting which of the second pipeline storage means, the third pipeline storage means, the fourth pipeline storage means and the fifth pipeline storage means is to receive the algorithm generated state value.

6. Hardware as in claim 1 wherein the first pipeline stage is a multi-cycle path.

7. Hardware as in claim 1 wherein the second pipeline stage is a multi-cycle path.

8. A method for implementing a hashing algorithm comprising:
   (a) generating an intermediate algorithm value within a first pipeline stage comprising the following substeps:
      (a.1) storing input data for the hashing algorithm in a first memory,
      (a.2) storing constants used for the hashing algorithm in a second memory, the second memory having a second memory output,
      (a.3) selecting data from the first memory to be placed on a memory output,
      (a.4) selecting a constant from the second memory to be placed on the memory output,
      (a.5) selecting one of a plurality of state values,
      (a.6) adding the data selected in substep (a.3), the constant selected in substep (a.4) and the state value selected in substep (a.5) to produce the intermediate algorithm value, and
      (a.7) storing the intermediate algorithm value; and,
   (b) generating an algorithm generated state value within a second pipeline stage comprising the following substeps:
      (b.1) selecting one of a plurality of hashing function values,
      (b.2) adding the intermediate algorithm value with the hashing function value selected in substep (b.1) to produce a result,
      (b.3) shifting the result produced in substep (b.2) to produce a shifted result,
      (b.4) adding the shifted result produced in substep (b.3) to one of the plurality of state values to generate an algorithm generated state value, and
      (b.5) storing the algorithm generated state value.

9. A method as in claim 8 wherein the hashing algorithm is the RSA Data Security, Inc. MD5 Message-Digest Algorithm.

10. A method as in claim 8 wherein the algorithm generated state value stored in substep (b.5) is used as a first state value and in substep (b.4), the shifted result produced in substep (b.3) is added to a second state value.

11. A method as in claim 10 wherein substep (b.4) is performed when the first state value is to be calculated.

12. A method as in claim 8 wherein substep (b.5) includes
   storing the algorithm generated state value in a first register when the algorithm generated state value is a first state value;
   storing the algorithm generated state value in a second register when the algorithm generated state value is a second state value;
   storing the algorithm generated state value in a third register when the algorithm generated state value is a third state value; and,
   storing the algorithm generated state value in a fourth register when the algorithm generated state value is a fourth state value.

13. A method as in claim 8 wherein in step (a) the first pipeline stage is a multi-cycle path.

14. A method as in claim 8 wherein in step (a) the second pipeline stage is a multi-cycle path.

* * * * *